United States Patent [19]

Tanaka et al.

[11] Patent Number: 4,833,224
[45] Date of Patent: May 23, 1989

[54] ETHYLENE COPOLYMERS AND PROCESS FOR PRODUCTION

[75] Inventors: Masato Tanaka; Syuji Machida, both of Sodegaura; Michitake Uoi, Ichihara, all of Japan

[73] Assignee: Idemitsu Kosan Company Limited, Tokyo, Japan

[21] Appl. No.: 915,712

[22] Filed: Oct. 6, 1986

[30] Foreign Application Priority Data

Oct. 11, 1985 [JP] Japan ................................. 60-224890
Sep. 17, 1986 [JP] Japan ................................. 61-218956
Sep. 17, 1986 [JP] Japan ................................. 61-218957

[51] Int. Cl.$^4$ .......................................... C08F 220/10
[52] U.S. Cl. ..................................................... 526/329
[58] Field of Search ......................................... 526/329

[56] References Cited

U.S. PATENT DOCUMENTS 3,736,305  5/1973  Kinkel et al. ........................ 526/329
3,954,720  5/1976  Spoor et al. ......................... 526/329
4,065,613 12/1977  Logothetis ........................... 526/329

FOREIGN PATENT DOCUMENTS 2235973  2/1973  Fed. Rep. of Germany ...... 526/329
 585969  5/1945  United Kingdom ................ 526/329
 582093 11/1946  United Kingdom ................ 526/329
 870480  6/1961  United Kingdom ................ 526/329
 981241  1/1965  United Kingdom ................ 526/329
2091745  8/1982  United Kingdom ................ 526/329

OTHER PUBLICATIONS

Polymer S, pp. 432–434, Hopkins et al. (1964).
Advances in Chemistry Series 125 ACS, Washington, D.C. (1973), pp. 98–107.
"Analysis of Ethylene Polymers and Copolymers by High Resolution Nuclear Magnetic Resonance", 1948, Analytical Chemistry.
"Adhesion"—in Japanese.

Primary Examiner—Joseph L. Schofer
Assistant Examiner—N. Sarafin
Attorney, Agent, or Firm—Frishauf, Holtz, Goodman & Woodward

[57] ABSTRACT

A new ethylene copolymer comprising: a repeating unit (A) represented by the formula:

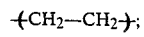

$-(CH_2-CH_2)-$;

a repeating unit (B) represented by the formula:

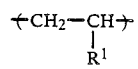

$-(CH_2-CH)-$
         $|$
         $R^1$ (wherein $R^1$ is defined as hereinbefore), and a repeating unit (C) represented by the formula:

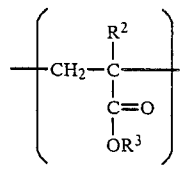

$$-\left(CH_2-\underset{\underset{OR^3}{\overset{\overset{R^2}{|}}{\underset{|}{C}}}}{C}-\right)-$$

(wherein $R^2$ and $R^3$ are defined as hereinbefore), said repeating units (A), (B) and (C) being orientated in a random and straight chain arrangement, said repeating unit (B) content being 0 to 45 mol %, said repeating unit (C) content being 0.001 to 45 mol %, and said copolymer having a weight average molecular weight of at least 5,000.

A process for producing said ethylene copolymer by using a catalyst containing a specific chromium compound.

15 Claims, No Drawings

ETHYLENE COPOLYMERS AND PROCESS FOR PRODUCTION

BACKGROUND OF THE INVENTION

The present invention relates to ethylene copolymers having a novel structure and a process for the production thereof. More particularly, it is concerned with ethylene copolymers which comprises a straight chain base polymer of an ethylene unit with an unsaturated carboxylic acid or its ester unit orientated in a random arrangement in the ethylene base polymer and, if desired, further with a small amount of alkyl side chains bonded to the ethylene base polymer, and to a process for efficiently producing the above ethylene copolymers.

As copolymers of ethylene and unsaturated carboxylic acid or its esters (e.g., acrylic acid esters), copolymers produced by the high pressure radical polymerization method or the low pressure Ziegler method have been known. Copolymers produced by the high pressure radical polymerization method have such a structure that the unsaturated carboxylic acid or its ester radical is orientated in the ethylene chain in a random arrangement. It is known, however, that in accordance with the high pressure radical polymerization method, monomers are not copolymerized in a straight chain arrangment; there are obtained only branched copolymers. On the other hand, in copolymers produced by the low pressure Ziegler method using titanium, zirconium and a vanadium compound as catalyst components, the unsaturated carboxylic acid or its ester is bonded to the ethylene polymer chain in a block copolymer arrangement. That is, by any of the conventional polymerization method including the high pressure radical polymerization method and the low pressure Ziegler method, copolymers in which the ethylene unit and the unsaturated carboxylic acid or its ester unit are arranged in a random configuration have not be obtained.

SUMMARY OF THE INVENTION

An object of the present invention is to provide ethylene copolymers having a novel structure that an unsaturated carboxylic acid or its ester unit is copolymerized in a random arrangement, an ethylene polymer chain is in a straight chain arrangement, and further a small amount of alkyl side chains are bonded to the ethylene base polymer chain.

Another object of the present invention is to provide a process for efficiently producing the above copolymers.

That is, the present invention relates to an ethylene copolymer comprising:

a repeating unit (A) represented by the formula (I):

a repeating unit (B) represented by the formula (II):

(wherein $R^1$ represents an alkyl group having 1 to 20 carbon atoms); and a repeating unit (C) represented by the formula (III):

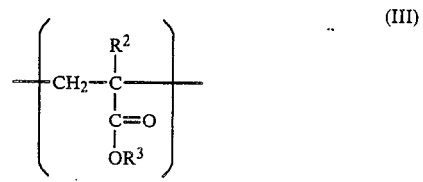

(wherein $R^2$ represents a hydrogen atom, a halogen atom, an alkyl group having 1 to 20 carbon atoms, an alkenyl group having 3 to 20 carbon atoms, a cycloalkyl group having 3 to 20 carbon atoms, an aryl group having 6 to 20 carbon atoms or an aralkyl group having 7 to 20 carbon atoms, and $R^3$ represents a hydrogen atom, an alkyl group having 1 to 20 carbon atoms, an alkenyl group having 3 to 20 carbon atoms, a cycloalkyl group having 3 to 20 carbon atoms, an aryl group having 6 to 20 carbon atoms or an aralkyl group having 7 to 20 carbon atoms), said repeating units (A), (B) and (C) being orientated in a random and straight chain arrangement, said repeating unit (B) content being 0 to 45 mol%, said repeating unit (C) content being 0.001 to 45 mol%, and said copolymer having a weight average molecular weight of at least 5,000.

Furthermore, the present invention relates to a process for producing the above ethylene copolymer which comprises copolymerizing ethylene and unsaturated carboxylic acid or its ester represented by the formula (IV):

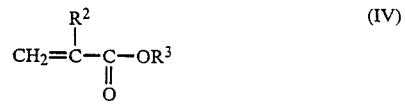

(wherein $R^2$ and $R^3$ are the same as defined above) by the use of a catalyst containing (a) a transition metal compound and (b) an organometallic compound as main components and further in the presence of a Lewis acid, wherein the transition metal compound (a) is at least one chromium compound selected from chromium carboxylic acid salts, chromium alkoxy compounds, chromium chelate compounds, chromium π-complexes, chromium aryl compounds and chromium halide, and the organometallic compound (b) is at least one compound selected from the organic compounds of Groups I to V metals of the Periodic Table.

DETAILED DESCRIPTION OF THE INVENTION

The ethylene copolymer of the present invention comprises the repeating unit (A) represented by the formula (I) (ethylene unit), the repeating unit (B) represented by the formula (II) (α-olefin unit) and the repeating unit (C) represented by the formula (III) (unsaturated carboxylic acid or its ester unit), or the repeating unit (A) and the repeating unit (C) only, which are arranged in a straight chain form.

The ethylene copolymer of the present invention will hereinafter be explained in detail.

The ethylene copolymer of the present invention basically comprises the repeating unit (A), ethylene unit, polymerized in a straight chain arrangement, and the repeating units (B) and (C) are bonded or copolymerized to the ethylene unit in a straight chain arrangement without formation of a side chain or branch, thereby forming as a whole a straight chain copolymer as the principle chain in which a side chain resulting from an alkyl group represented by $R^1$ of the repeating unit (B) is linked to the principle chain. Furthermore, in the ethylene copolymer of the present invention, almost no side chain other than that resulting from $R^1$ exists and the side chain is directly bonded to the principle chain; that is, the ethylene copolymer of the present invention does not have a complicated structure containing double or triple branches other than the side chain resulting from $R^1$.

The ethylene copolymer of the present invention includes copolymers not having the repeating unit (B), i.e., copolymers not having an alkyl side chain resulting from $R^1$.

Furthermore, in the principle chain of the ethylene copolymer of the present invention, there is almost no region where the repeating unit (B) or (C) is copolymerized in a block arrangement.

In the ethylene copolymer of the present invention, the repeating unit (B) content is 0 to 45 mol%, preferably 0 to 30 mol% and more preferably 0 to 15 mol%, the repeating unit (C) content is 0.001 to 45 mol%, preferably 0.1 to 30 mol% and more preferably 1 to 15 mol%, and the weight average molecular weight is at least 5,000 and preferably 10,000 to 3,000,000.

The repeating unit (B) represented by the general formula (II) varies depending on the type of $R^1$. $R^1$ is an alkyl group having 1 to 20 carbon atoms, specifically a methyl group, an ethyl group, a n-propyl group, an iso-propyl group, a n-butyl group, an iso-butyl group, a tert-butyl group, a n-pentyl group, a n-hexyl group, a n-octyl group and the like.

The repeating unit (C) represented by the general formula (III) varies depending on the types of $R^2$ and $R^3$. More specifically, it includes an acrylic acid unit, a methyl acrylate unit, an ethyl acrylate unit, a n-propyl acrylate unit, an iso-propyl acrylate unit, a n-butyl acrylate unit, an iso-butyl acrylate unit, a tert-butyl acrylate unit, a n-hexyl acrylate unit, a n-octyl acrylate unit, a 2-ethylhexyl acrylate unit, a benzyl acrylate unit, a methacrylic acid unit, a methyl methacrylate unit, an ethyl methacrylate unit, a n-propyl methacrylate unit, an iso-propyl methacrylate unit, a n-butyl methacrylate unit, an iso-butyl methacrylate unit, a tert-butyl methacrylate unit, a 2-ethylhexyl methacrylate unit, a phenyl methacrylate unit, a methyl α-chloroacrylate unit, an ethyl α-chloroacrylate unit, and a methyl α-phenylacrylate unit.

The ethylene copolymer of the present invention can be produced by various methods. Usually the ethylene copolymer of the present invention is produced by copolymerizing ethylene and unsaturated carboxylic acid or its ester represented by the general formula (IV) described above. In this reaction, ethylene as one of the starting materials constitutes the repeating unit (A) represented by the formula (I). Depending on reaction conditions, ethylene is partially polymerized in a branched arrangement, thereby forming the repeating unit (B) represented by the formula (II). In this case, $R^1$ of the formula (II) becomes an alkyl group having 1 or 2 carbon atoms, i.e., a methyl group or an ethyl group and does not almost form a long chain alkyl group having 3 or more carbon atoms. Furthermore, the proportion of the repeating unit (B) represented by the formula (II) is relatively small and in some cases, the repeating unit (B) does not exist at all.

In a case where the repeating unit (B) content of the ethylene copolymer is intended to increase, and/or in a case where $R^1$ of the formula (II) is not limited to a methyl group and an ethyl group and is intended to make a long chain alkyl group, it suffices that as starting materials, along with ethylene and the unsaturated carboxylic acid or its ester of the general formula (IV), α-olefins having 3 or more carbon atoms, particularly α-olefins having 3 to 22 carbon atoms are used depending on the type of the desired ethylene copolymer. α-Olefins which can be used include propylene, 1-butene, 1-pentene, 1-hexene, 1-octene, 3-methylbutene-1, 4-methylpentene-1 and 1-decene. The type of the α-olefin is determined appropriately depending on the number of carbon atoms contained in $R^1$ of the formula (II).

In accordance with the process of the present invention, the above ethylene copolymer is produced by copolymerizing the above starting materials by the use of a catalyst containing the transition metal compound (a) and the organometallic compound (b) as main components. As the transition metal compound (a), one or more chromium compounds selected from chromium carboxylic acid salts, chromium alkoxy compounds, chromium chelate compounds, chromium π-complexes, chromium aryl compounds and chromium halide are used. As the organo-metallic compound (b), at least one compound selected from the organic compounds of Groups I to V metals is used.

The catalyst which is used in the present invention, comprising the transition metal compound (a) and the organo-metallic compound (b) is described below in detail.

Chromium carboxylic acid salts include, as well as the carboxylic acid salts of chromium, their carboxylic anhyride adducts, ester adducts, ether adducts and ketone adducts. As the chromium carboxylic acid salts, compounds represented by the general formulae: $Cr(OCOR^4)_3$, $Cr(OCOR^4)_3 \cdot (R^5OR_6)_n$, $Cr(OCOR^4)_3$, $Cr(OCOR^4) \cdot R^9(COOR^{10})_2$, $Cr(OCOR^4)_3 \cdot (R^{11}{}_2CO)_n$ and $Cr(OCOR^4)_3 \cdot [R^{12}CO)_2O]_n$ (wherein $R^4$ to $R^{12}$ each represent an alkyl group having 1 to 20 carbon atoms, an alkenyl group, a vinyl group, a cycloalkyl group, an aryl group, a haloalkyl group, an aralkyl group or a hydrogen atom, and n represents a solid number of 1 or more. More specifically, aliphatic carboxylic acid salts such as $Cr(CH_3COO)_3$, $Cr(C_{17}H_{35}COO)_3$, aromatic carboxylic acid salts such as $Cr(C_6H_5COO)_3$ and $Cr(CH_3C_6H_6COO)_3$, and the carboxylic anhydride adducts, ester adducts, ether adducts, ketone adducts and the like of the above carboxylic acid salts can be used. These adducts include fatty acid anhydrides such as acetic anhydride, propionic anhyride, butyric anhydride, iso-butyric anhydride, valeric anhydride and iso-valeric anhyride, aromatic acid anhydrides such as benzoic anhyride, toluic anhyride, cinnamic anhydride, phthalic anhyride and maleic anhydride, aliphatic esters such as methyl formate, ethyl formate, propyl formate, butyl formate, methyl acetate, ethyl acetate, propyl acetate, butyl acetate, hexyl acetate, octyl acetate, benxyl acetate, vinyl acetate, phenyl acetate, benzyl acetate, cyclohexyl acetate, methyl propionate, ethyl propionate, propyl propionate, butyl propionate, octyl propionate, phenyl propionate, benzyl propionate, methyl butyrate, ethyl butyrate, propyl butyrate, amyl butyrate, octyl butyrate, methyl valerate, ethyl valerate, propyl valerate, butyl valerate, methyl acrylate, ethyl acrylate, butyl acrylate, 2-ethylhexyl acrylate, methyl methacrylate, ethyl methacrylate, butyl methacrylate, methyl chloroacetate, ethyl dichloroacetate, ethyl crotonate, ethyl pivalate, dimethyl maleate and ethyl cyclohexanecarboxylate, aromatic esters such as methyl benzoate, ethyl benzoate, propyl benzoate, butyl benzoate, octyl benzoate, cyclohexyl benzoate, benzyl benzoate, methyl toluate, ethyl toluate, ethyl ethylbenzoate and ethyl anisate, ethers such as methyl ether, ethyl ether, isopropyl ether, n-butyl ether, amyl ether, tetrahydrofuran, anisole and diphenyl ether, and ketones such as acetone, methyl ethyl ketone, methyl isobutyl ketone, acetophenone, benzophenone and benzoquinone.

As chromium alkoxy compounds, compounds represented by the general formula (V):

are usually used. In the general formula (V), $R^{13}$ represents an alkyl group having 1 to 20 carbon atoms, an alkenyl group, a cycloalkyl group, an aryl group or an aralkyl group. Representative examples of the groups represented by $R^{13}$ are a methyl group, an ethyl group, a n-propyl group, an iso-propyl group, a n-butyl group, an iso-butyl group, a hexyl group, a 2-ethylhexyl group and a phenyl group. $X^1$ represents a halogen atom (e.g., a chlorine atom, a bromine atom and an iodine atom). m represents a real number satisfying the relation of $0 \leq m < 4$.

Representative examples of the compounds represented by the general formula (V) are tetramethoxychromium, tetraethoxychromium, tetra-n-butoxychromium, tetra-iso-butoxychromium, tetra-tert-butoxychromium, tetrahexyloxychromium, tetrastearyloxychromium, tetraphenoxychromium, triethoxychromium monochloride, diethoxychromium dichloride, tri-n-butoxychromium monochloride, and tri-n-butoxychromium monochloride.

The above chromium chelate compounds include chromium trisacetylacetonate represented by the formula: $Cr(acac)_3$, chromium tris(2-methyl-1,3-butanediol) represented by the formula: $Cr(mbd)_3$, and chromium tris(1,3-butanedionate) represented by the formula: $Cr(bd)_3$. The symbol "acac" indicates an acetylacetonate group, and chromium trisacetylacetonate has the following structural formula:

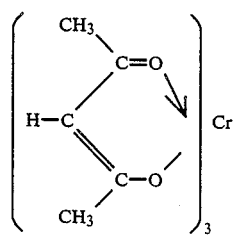

The symbol "mbd" indicates a 2-methyl-1,3-butanedionate group, and chromium tris(2-methyl-1,3-butanedionate) has the following structural formula:

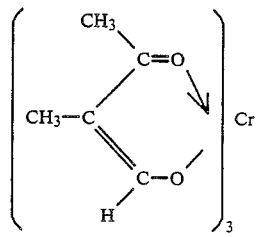

The symbol "bd" indicates a 1,3-butanedionate group, and chromium tris(1,3-butanedionate) has the following structural formula:

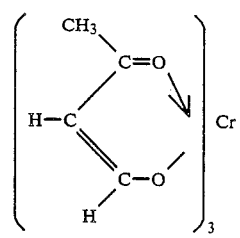

The above chromium π-complex compounds include aromatic ring π-complex compounds such as biscyclopentadienylchromium represented by the formula: $(cp)_2Cr$ (wherein the symbol "cp" indicates a cyclopentadienyl group), bisbenzenechromium represented by the formula: $(C_6H_6)_2Cr$, diphenylbenzenechromium represented by the formula: $(2C_6H_5)(C_6H_6)Cr$, dihexamethylbenzenechromium represented by the formula:

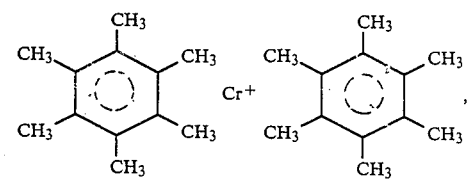

π-cyclopentadienylbromochromium acetylacetonate represented by the formula:

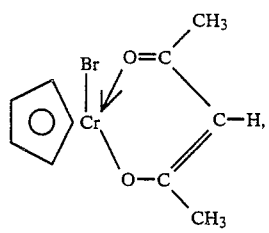

π-cyclopentadienyl(benzene)chromium represented by the formula:

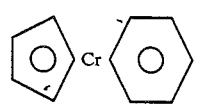

and π-cyclopentadienyl-π-cycloheptadienylchromium represented by the formula:

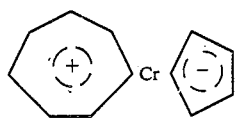

and π-allyl complex compounds such as tris(η-allyl)-chromium and tetrakis(η-allyl)chromium.

The above chromium aryl compounds include diphenylchromium and tetraphenyltristetrahydrofuran chromium.

Preferred examples of the above chromium halide are compounds represented by the general formula: $CrX^2_n$ (wherein $X^2$ indicates a halogen atom, and n indicates 2 or 3). Examples of these compounds are chromium trichloride, chromium tribromide, chromium triiodide, chromium dichloride, chromium dibromide and chromium diiodide.

In the present invention, as the transition metal compound (a), at least one compound selected from the specified chromium compounds as described above is used.

As the organometallic compound (b), at least one compound selected from Groups I to V metal-containing organic compounds is used. These Groups I to V metal-containing organic compounds include compounds represented by the general formula (VI):

$$R_k MX^3_{i-k} \qquad (VI)$$

In the general formula (VI), R represents an alkyl group having 1 to 20 carbon atoms, an alkenyl group, a cycloalkyl group, an aryl group or an aralkyl group. Representative examples of the groups represented by R are a methyl group, an ethyl group, a n-propyl group, an iso-propyl group, a n-butyl group, an iso-butyl group, a hexyl group, a 2-ethylhexyl group and a phenyl group. M represents lithium, sodium, potassium, magnesium, zinc, cadmium, aluminum, boron, gallium, silicon, tin, antimony or bismuth. $X^3$ represents a halogen atom, such as a chlorine atom, a bromine atom and an iodine atom. $\underline{i}$ represents an atomic valency of M and is usually a real number of 1 to 5. $\underline{k}$ represents a real number of 0 < k ≦ i.

Representative examples of the compounds represented by the general formula (VI) are alkyllithium such as methyllithium, ethyllithium, propyllithium and butyllithium, alkylmagnesium such as diethylmagnesium, ethylbutylmagnesium, di-n-butylmagnesium, ethylchloromagnesium and ethylbromomagnesium, dialkylzinc such as dimethylzinc, diethylzinc, dipropylzinc and dibutylzinc, alkylgallium such as trimethylgallium, triethylgallium, tripropylgallium and tributylgallium, alkylboron such as triethylboron, tripropylboron and tributylboron, and alkyltin such as tetraethyltin, tetrapropyltin, tributylchlorotin, tetraphenyltin and triphenylchlorotin.

In a case where M is aluminum, representative examples of the compounds of the general formula (VI) are trialkylaluminum such as trimethylaluminum, triethylaluminum, triisopropylaluminum, triisobutylaluminum and trioctylaluminum; dialkylaluminum monohalide such as diethylaluminum monochloride, diethylaluminum monobromide, diethylaluminum monoiodide, diisopropylaluminum monochloride, diisobutylaluminum monochloride and dioctylaluminum monochloride; alkylaluminum sesquihalide such as methylaluminum sequichloride, ethylaluminum sesquichloride, ethylaluminum sesquibromide and butylaluminum sesquichloride; and alkylaluminum dichloride such as methylaluminum dichloride, ethylaluminum dichloride, propylaluminum dichloride and butylaluminum dichloride. Mixtures of the above compounds are also suitably used. In addition, alkyl group-containing aluminoxane formed by the reaction of alkylaluminum and water can be used.

Of the above compounds, aluminum, tin and magnesium compounds are particularly preferred.

There are not special limitations to the ratio of the transition metal compound (a) to the organometallic compound (b) to be used in the process of the present invention. The ratio of the transition metal compound (a) to the organometallic compound (b) is usually determined so that the molar ratio of a metal atom contained in the organo-metallic compound (b) to a chromium atom contained in the transition metal compound (a) is 0.1/1 to 5,000/1 and preferably 1/1 to 1,000/1.

In accordance with the process of the present invention, ethylene and unsaturated carboxylic acid or esters thereof are copolymerized using the above catalyst in the presence of a Lewis acid to produce ethylene copolymers.

Lewis acids which can be used include Lewis acid compounds capable of forming a complex with a lone electron pair of a polar group, such as Group I, II, III, V or VIII metal halide. Aluminum, boron, zinc, tin, magnesium and antimony halides such as aluminum trichloride, aluminum tribromide, ethylaluminum dichloride, diethylaluminum dichloride, boron trichloride, zinc dichloride, tin tetrachloride, alkyltin halide, magnesium dichloride, antimony pentachloride and antimony trichloride are preferred. Particularly preferred are aluminum trichloride, aluminum tribromide and ethylaluminum dichloride.

There are no special limitations to the unsaturated carboxylic acid or its ester which is to be copolymerized with ethylene. Usually the above compounds represented by the general formula (IV) are used. More specifically, compounds corresponding to the repeating unit (C) of the ethylene copolymer to be produced are chosen. For example, an acrylic acid, a methyl acrylate, an ethyl acrylate, a n-propyl acrylate, an iso-propyl acrylate, a n-butyl acrylate, an iso-butyl acrylate, a tert-butyl acrylate, a n-hexyl acrylate, a n-octyl acrylate, a 2-ethylhexyl acrylate, a benzyl acrylate, a methacrylic acid, a methyl methacrylate, an ethyl methacrylate, a n-propyl methacrylate, an iso-propyl methacrylate, a n-butyl methacrylate, an iso-butyl methacrylate, a tert-butyl methacrylate, a 2-ethylhexyl methacrylate, a phenyl methacrylate, a methyl α-chloroacrylate, an ethyl α-chloroacrylate, and a methyl α-phenylacrylate can be used singly or in combination with each other.

The ratio of the above unsaturated carboxylic acid or its ester to ethylene is determined appropriately according to the physical properties of the desired ethylene copolymer.

The molar ratio of the above Lewis acid to the unsaturated carboxylic acid or its ester is 0.1/1 to 10/1 and preferably 0.2/1 to 1/1.

The process of the present invention is not critical in its copolymerization manner; any of slurry polymerization, solution polymerization, gas polymerization and so forth can be employed, and any of continuous polymerization and non-continuous polymerization can be employed. In the practice of the process of the present invention by solution polymerization, for example, aliphatic hydrocarbons, alicyclic hydrocarbons, aromatic hydrocarbons, and halogenated hydrocarbons can be used as polymerization solvents. More specifically, pentane, hexane, peptane, octane, decane, dodecane, cyclohexane, benzene, toluene, xylene, ethylbenzene, chlorobenzene, ethylene dichloride, kerosene and the like can be used.

In connection with polymerization conditions, the reaction pressure is atmospheric pressure to 100 kilograms per square centimeter by gauge ($kg/cm^2$ G) and preferably atmospheric pressure to 30 $kg/cm^2$ G, and the reaction temperature is $-80°$ to $200°$ C. and preferably $-50°$ to $60°$ C. The reaction time is not critical; usually it is chosen appropriately from the range of 1 minute to 10 hours. Controlling a molecular weight in the practice of the process of the present invention can be carried out by known techniques such as by using hydrogen.

The ethylene copolymer of the present invention, which is produced by the aforementioned process, possesses the aforementioned straight chain and random structure and, as compared with ethylene copolymers produced by the conventional high pressure radical polymerization method, has a high melting point ($100°$ to $134°$ C.) and a high degree of crystallization (15 to 70%). Accordingly the ethylene copolymer of the present invention has a high mechanical strength and is also excellent in elasticity, and thus can be used for fabrication of industrial materials which are needed to have good printing properties, adhesion properties and low temperature flexibility.

In accordance with the process of the present invention, the above ethylene copolymer can be efficiently produced because the catalytic activity is high, and furthermore the conversion of unsaturated carboxylic acid or its ester into the ethylene copolymer can be increased.

EXAMPLE 1 (1) Preparation of Chromium-Containing Catalyst Component

A 300-milliliter (ml) flask the atmosphere of which had been replaced with argon was charged with 1.1 grams (g) (4.45 millimoles (mmol)) of chromium acetate monohydrate ($Cr(CH_3COO)_3 \cdot H_2O$), 40 ml of acetic acid and 40 ml of acetic anhydride, which were then reacted while stirring under reflux for 20 hours. Then the acetic acid and acetic anhydride were distilled away to obtain a green solid. This solid was dried at $120°$ C. for 48 hours in a stream of argon. After the temperature was lowered, toluene was added to form 200 ml of a green catalyst slurry. (2) Production of Copolymer 800 ml of dehydrated toluene was introduced in a 1-liter stainless steel autoclave, and then 12.7 millimoles (mmol) of a toluene solution of a mixture of equimolar amounts of ethyl acrylate and ball milled aluminum trichloride was added. Then 8 mmol of diethylaluminum monochloride and 0.2 mmol (calculated as chromium) of the chromium-containing catalyst component prepared in (1) above were introduced while maintaining the temperature at $40°$ C. and stirring, and hydrogen gas was introduced and saturated while stirring at a rate of 500 r.p.m. (rotations per minute) so that the hydrogen partial pressure was 1.0 kilograms per square centimeter by gauge ($kg/cm^2G$). Then, ethylene was introduced so that the ethylene partial pressure was 2.0 $kg/cm^2G$, thereby making the total pressure 3 $kg/cm^2G$.

Polymerization was conducted for 2 hours, and then the pressure was removed. The contents were introduced in methanol and precipitated. The precipitated solid was recovered by filtration and, after de-ashing treatment using a hydrochloric acid-methanol mixture, was extracted with acetone for 5 hours to remove amorphous polymers. The extraction residue thus obtained was dried under reduced pressure at $80°$ C. for 2 hours to yield 1.82 g of a white polymer. In an infrared absorption spectrum of the white polymer (copolymer), an absorption peak at 1730 $cm^{-1}$ as assinged to a carbonyl group and an absorption peak at 1160 $cm^{-1}$ as assinged to an ether bond were observed. Based on the ratio of the above absorption peaks to absorption peaks in the neighborhood of 720 $cm^{-1}$ and 730 $cm^{-1}$ as assinged to a methylene chain, it was determined that the ethyl acrylate content of the copolymer was 4.4 mol%. The melt index (MI) (2.16 kg) at $190°$ C. was 0.66 g per ten minutes (g/10 min). The melting point of the copolymer, which was determined by heat treating at $180°$ C. for 3 minutes in a nitrogen gas by the use of Model DSC II manufactured by Perkin Elmer Co., Ltd., decreasing the temperature to $50°$ C. for 5 minutes, and then measuring at a temperature-raising rate of $10°$ C. per minute, was $127°$ C. This value is lower by $8°$ C. than the melting point, $135°$ C., of polyethylene. This confirms that as a result of random arrangement of the ethyl acrylate unit in the ethylene chain of the copolymer, the crystal form of the polyethylene portion is disturbed.

The degree of crystallization of the above copolymer as calculated by the symmetrical reflection method based on an X-ray diffraction (Rhotaflex 35 kilovolts (kv), 120 milliamperes (mA)) of a film which was produced by press molding at $190°$ C. and then annealing at $100°$ C. for 10 minutes was 48.2%. The results are shown in Table 1.

EXAMPLE 2

The procedure of Example 1 (2) was repeated with the exception that conditions were changed as shown in Table 1. The results are shown in Table 1.

EXAMPLE 3 (1) Preparation of Chromium-Containing Catalyst Component

In a 200-ml flask the atmosphere of which had been replaced with argon was placed 2.1 9 (6 mmol) of chromium triacetylacetonate, and 200 ml of toluene was added to dissolve therein the chromium triacetylacetonate. The solution thus prepared was used as a chromium-containing catalyst component in the subsequent reaction. (2) Production of Copolymer The procedure of Example 2 was repeated with the exception that the chromium-containing catalyst component prepared in (1) above was used. The results are shown in Table 1.

EXAMPLE 4 (1) Preparation of Chromium-Containing Catalyst Component

In a 200-ml flask the atmosphere of which had been replaced with argon were placed 10 stainless steel balls (diameter: 5–10 millimeters (mm)) and then 3.6 g (4.0 mmol) of chromium stearate and 100 ml of toluene, which were then ball milled with stirring at room temperature for 10 hours. After ball milling, toluene was added to make the total volume 200 ml. As a result, a black purple gel-like product was obtained, and this product was used as a chromium-containing catalyst component in the subsequent reaction. (2) Production of Copolymer The procedure of Example 2 was repeated with the exception that the chromium-containing catalyst component prepared in (1) above was used. The results are shown in Table 1.

EXAMPLE 5 (1) Preparation of Chromium-Containing Catalyst Component 0.556 g (1.61 mmol) of chromium tetra-tert-butoxide was dissolved in 50 ml of toluene. The solution thus prepared was used as a chromium-containing catalyst component in the subsequent reaction. (2) Production of Copolymer The procedure of Example 2 was repeated with the exception that the chromium-containing catalyst component prepared in (1) above was used. The results are shown in Table 1.

EXAMPLE 6

(1) Preparation of Chromium-Containing Catalyst Component

In a 200-ml flask the atmosphere of which had been replaced with argon, 1.22 g (6.7 mmol) of biscyclopentadienyl chromium was dissolved in 200 ml of toluene. The solution thus prepared was used as a chromium-containing catalyst component in the subsequent reaction.

(2) Production of Copolymer

The procedure of Example 2 was repeated with the exception that the chromium-containing catalyst component prepared in (1) above was used. The results are shown in Table 1.

EXAMPLE 7

The ethylene-ethyl acrylate copolymer produced in Example 1 (2) was contacted with an aqueous sodium hydroxide solution (concentration: 60% by weight (wt%)) in ethanol at 80° C. for 3 hours, washed with diluted hydrochloric acid, and then washed with water and dried to yield a hydrolysised product. An infrared absorption spectral analysis of the above saponified product showed that the absorption peak in the neighborhood of 1730 cm$^{-1}$ as assinged to carboxylic acid ester (ethyl acrylate) which had been observed before hydrolysis disappeared and instead an absorption peak as assinged to the carbonyl group of carboxylic acid appeared in the neighborhood of 1700 cm$^{-1}$. Similarly, in the $^{13}C$-NMR spectrum, the peak based on the ester carbon disappeared.

Based on the above analytical results, it was confirmed that the hydrolysised product was an ethylene-acrylic acid copolymer. The melting point of the copolymer as determined by the differential thermal analysis was 128° C.

COMPARATIVE EXAMPLE 1

(1) Preparation of Vanadium-Containing Catalyst Component

A mixture of 80 ml of hexane and 0.66 ml (7 mmol) of vanadium trichloride was placed in a 300-ml flask, and then 3.9 ml of a hexane solution of tri-n-butyl gallium (0.17 mmol/ml) was dropped over 30 minutes. They were reacted at 20° C. for 3 hours, and a formed solid component was washed five times with 100 ml of hexane and finally made so that the total volume was 200 ml. The concentration of vanadium in the above prepared catalyst slurry was 21 mmol/l. (2) Production of Copolymer 300 ml of hexane and 2.67 g (20 mmol) of aluminum chloride were placed in an argon atmosphere in a 500-ml autoclave and then 2.17 ml (20 mmol) of ethyl acrylate was added. The resulting mixture was raised in temperature to 50° C. and stirred. Then, 2 mmol of triethyl aluminum was added, and furthermore 2.38 ml (0.05 mmol as vanadium) of the catalyst slurry prepared in (1) above was added. Copolymerization was conducted at 50° C. for 3 hours while continuously introducing ethylene in such a manner that the total pressure became 2 kg/cm$^2$G. After the completion of reaction, the pressure was decreased, and the product was washed with a methanol-hydrochloric acid mixture and extracted with acetone for 6 hours. The extraction residue was dried to yield 5.35 g of a copolymer.

The properties of the above copolymer are shown in Table 1. The melting point of the copolymer was 135° C., which is equal to that of polyethylene. The copolymer was a copolymer in which the ethyl acrylate unit was block polymerized to the ethylene chain. Analytical results of the $^{13}C$-NMR spectra are shown in Table 2.

COMPARATIVE EXAMPLE 2

An ethylene-ethyl acrylate copolymer produced by the high pressure radical polymerization method (ethyl acrylate unit content: 2 mol%; produced by Nippon Unicar Co., Ltd.; trade name: NUC 6220) was measured for properties. The results are shown in Table 1, and a $^{13}C$-NMR spectrum of the copolymer is shown in FIG. 3.

Analytical results of the $^{13}C$-NMR spectra are shown in Table 2.

TABLE 1

| Run No. | Chromium-Containing Catalyst Component | | Aluminum-Containing Catalyst Component | | Reaction Temperature (°C.) | Ethylene Feed Pressure (kg/cm$^2$G) | Hydrogen Feed Pressure (kg/cm$^2$G) | Amount of Ethyl Acrylate (mmol) |
|---|---|---|---|---|---|---|---|---|
| | Type | Amount (mmol) | Type | Amount (mmol) | | | | |
| Example 1 | Cr(OAc)$_3$/Ac$_2$O*$^1$ | 0.2 | DEAC*$^6$ | 8.0 | 40 | 2.0 | 1.0 | 12.7 |
| Example 2 | Cr(OAc)$_3$/Ac$_2$O*$^1$ | 0.2 | DEAC*$^6$ | 8.0 | 20 | 2.0 | 2.0 | 26.7 |
| Example 3 | Cr(acac)$_3$*$^2$ | 0.2 | DEAC*$^6$ | 8.0 | 20 | 2.0 | 2.0 | 26.7 |
| Example 4 | CrSt$_3$*$^3$ | 0.2 | DEAC*$^6$ | 8.0 | 20 | 2.0 | 2.0 | 26.7 |
| Example 5 | Cr(O.t-Bu)*$^4$ | 0.2 | DEAC*$^6$ | 8.0 | 20 | 2.0 | 2.0 | 26.7 |
| Example 6 | Cp$_2$Cr*$^5$ | 0.2 | DEAC*$^6$ | 8.0 | 20 | 2.0 | 2.0 | 26.7 |

| | | | Properties of Copolymer | | | |
|---|---|---|---|---|---|---|
| Amount of Aluminum | Yield of | Catalytic | Ethyl Acrylate Unit | Melting | Weight Average | Degree of Crystalli- |

TABLE 1-continued

| Run No. | Trichloride (mmol) | Copolymer (g) | Activity (kg/g · Cr) | Content (mol %) | Point (°C.) | MI (g/10 min) | Molecular Weight | zation (%) |
|---|---|---|---|---|---|---|---|---|
| Example 1 | 12.7 | 1.82 | 0.17 | 4.4 | 127 | 0.66 | 125000 | 48.2 |
| Example 2 | 26.7 | 4.27 | 0.41 | 3.2 | 128 | 2.15 | 79000 | 51.3 |
| Example 3 | 26.7 | 3.66 | 0.35 | 2.5 | 129 | 2.11 | 79000 | 53.5 |
| Example 4 | 26.7 | 2.51 | 0.24 | 3.1 | 128 | 2.03 | 80000 | 50.2 |
| Example 5 | 26.7 | 3.98 | 0.38 | 3.9 | 127 | 1.85 | 82000 | 49.1 |
| Example 6 | 26.7 | 3.25 | 0.31 | 2.8 | 129 | 1.54 | 85000 | 50.5 |
| Comparative Example 1 | | | | 3.2 | 135 | 1.50 | 95000 | 52.0 |
| Comparative Example 2 | | | | 2.0 | 97 | 3.86 | 63000 | 22.6 |

*[1] Chromium acetate/acetate anhydride (prepared in Example 1 (1))
*[2] Chromium triacetylacetonate (prepared in Example 3 (1))
*[3] Chromium stearate (prepared in Example 4 (1))
*[4] Chromium tetra-tert-butoxide (prepared in Example 5 (1))
*[5] Biscyclopentadienyl chromium (prepared in Example 6 (1))
*[6] Diethylaluminum monochloride

TABLE 2

| | Principle Chain | | | | | | Alkyl Branch (Long Chain) | | | Ethyl (Ethyl Acrylate Portion) | |
|---|---|---|---|---|---|---|---|---|---|---|---|
| | Random $CH_2$ | | | | | homo $CH_2$ | $CH_2$ | $CH_2$ | | | |
| Run No. | $\alpha\epsilon(\epsilon^+)$ | $\gamma\gamma$ | $\gamma\epsilon(\epsilon^+)$ | $\beta\delta(\delta^+)$ | $(CH_2)_n$ | $CH^*$ | $\alpha\alpha$ | $\alpha$ | $\beta$ | $CH_3$ | $CH_2$ | $CH_3$ |
| Example 1 | 33.5 | 30 | 28.9 | 27.2 | 29.5 | 45.2 | — | — | — | — | 59.3 | 14.0 |
| Comparative Example 1 | — | — | — | — | 29.5 | 43.6 | 34.6 | — | — | — | 59.6 | 13.9 |
| Comparative Example 2 | 32.4 | 30.1 | 29.5 | 29.2 | 27.4 | 45.4 | — | 34.3 | 27.0 | 14.2 | 59.2 | 13.6 |

The structure of the ethylene-ethyl acrylate random copolymer is as follows:

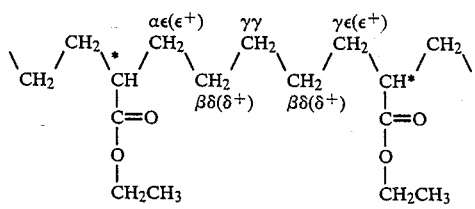

On the other hand, the structure of the ethyleneethyl acrylate block copolymer as produced in Comparative Example 1 is as follows:

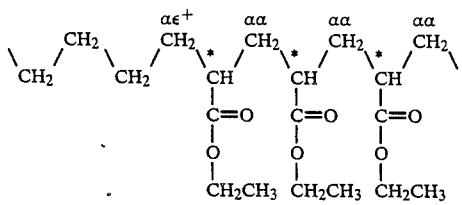

Based on the above results, it can be understood that the ethylene copolymer of the present invention possesses a straight chain structure with almost no branch chain, which is clearly different from the branched skeleton of the copolymer produced by the high pressure radical polymerization method. In connection with the principle chain, it is apparent that the copolymer possesses a random structure like the copolymer of Comparative Example 2. EXAMPLE 8 (1) Preparation of Chromium-Containing Catalyst Component A chromium-containing catalyst component slurry was prepared in the same manner as in Example 1 (1).
(2) Production of Copolymer In a 1-liter stainless steel autoclave were introduced 800 ml of dehydrated toluene, and then 19.2 mmol of a toluene solution of a mixture of equimolar amounts of ethyl acrylate and aluminum trichloride. Then, 4 mmol of diethylaluminum chloride and 0.1 mmol of the chromium-containing catalyst component prepared in (1) above were added with stirring at 30° C. Then, the resulting mixture was saturated with hydrogen so that the hydrogen partial pressure was 2.0 kg/cm²G, and ethylene was continuously introduced so as to maintain the total pressure at 10 kg/cm²G. After polymerization was conducted for 3 hours, the pressure was removed, and a copolymer product was introduced in methanol, filtered off and then was subjected to de-ashing treatment using a hydrochloric acid-methanol mixture. Then, extraction with acetone was conducted for 5 hours to thereby remove amorphous polymers. The extraction residue was dried under reduced pressure at 80° C. for 2 hours to thereby obtain 20.6 g of a white copolymer.

In an infrared absorption spectrum of the above copolymer, an absorption peak as assigned to the carbonyl group of carboxylate was observed at 1730 cm$^{-1}$ and an absorption peak as assigned to the ether bond, at 1160 cm$^{-1}$. Based on these data, it was determined that the ethyl acrylate content of the copolymer was 2.5 mol%. In addition, in a nuclear magnetic resonance spectral analysis using carbon isotope ($^{13}$C—NMR), the carbon signal of —$CH_2$— of an ethyl branch was observed at 26.4 ppm and the carbon signal of —$CH_3$ terminal of an ethyl branch, at 10.7 ppm. Based on these data, it was confirmed that a degree of branching of the copolymer was 8.9 per 1,000 of carbon atoms. The melting point of the copolymer, which was determined by heat treating at 180° C. for 3 minutes in nitrogen gas by the use of Model DSC II manufactured by Perkin Elmer Co., Ltd., decreasing the temperature to 50° C. in 5 minutes, and then measuing at a temperature-raising rate of 10°

C. per minute, was 128° C. The melt index of the copolymer was determined at 190° C. under a load of 2.16 kg was 0.15 g/10 min.

The degree of crystallization of the above copolymer as calculated by the symmetrical reflection method based on an X-ray diffraction (Rhotaflex 35 kv, 120 mA) of a film which was produced by press molding the copolymer at 190° C. and then annealing at 100° C. for 10 minutes was 50.4%. The results are

EXAMPLE 9

42.2 g of a copolymer was produced in the same manner as in Example 8 (2) except that the amount of the toluene solution of a mixture of equimolar amounts of ethyl acrylate and aluminum trichloride being used was 26.7 mmol, the polymerization temperature was 20° C., the hydrogen partial pressure was 7 kg/cm$^2$G, and the ethylene partial pressure was 3 kg/cm$^2$G.

The properties of the above copolymer are shown in Table 3.

EXAMPLE 10

20.4 g of a copolymer was produced in the same manner as in Example 8 (2) except that the amount of the toluene solution of a mixture of equimolar amounts of ethyl acrylate and aluminum trichloride being used was 26.7 mmol, the polymerization temperature was 20° C., the hydrogen partial pressure was 8 kg/cm$^2$G, and the ethylene partial pressure was 2 kg/cm$^2$G.

The properties of the above copolymer are shown in Table 3.

EXAMPLE 11

24.2 g of a copolymer was produced in the same manner as in Example 8 (2) except that the amount of the toluene solution of a mixture of equimolar amounts of ethyl acrylate and aluminum trichloride being used was 26.7 mmol.

The properties of the above copolymer are shown in Table 3.

EXAMPLE 12

8.04 g of a copolymer was produced in the same manner as in Example 8 (2) except that the amount of the toluene solution of a mixture of equimolar amounts of ethyl acrylate and aluminum trichloride being used was 64 mmol, the polymerization temperature was 20° C., the hydrogen partial pressure was 2 kg/cm$^2$G, and the ethylene partial pressure was 4 kg/cm$^2$G.

The properties of the above copolymer are shown in Table 3.

EXAMPLE 13

15.0 g of a copolymer was produced in the same manner as in Example 8 (2) except that the amount of the toluene solution of a mixture of equimolar amounts of ethyl acrylate and aluminum trichloride being used was 26.7 mmol, the hydrogen partial pressure was 4 kg/cm$^2$G, and the ethylene partial pressure was 6 kg/cm$^2$G.

The properties of the above copolymer are shown in Table 3.

EXAMPLE 14

13.5 g of a copolymer was produced in the same manner as in Example 8 (2) except that the amount of the toluene solution of a mixture of equimolar amounts of ethyl acrylate and aluminum trichloride being used was 26.7 mmol, the hydrogen partial pressure was 5 kg/cm$^2$G, and the ethylene partial pressure was 5 kg/cm$^2$G.

The properties of the above copolymer are shown in Table 3.

EXAMPLE 15

9.5 g of a copolymer was produced in the same manner as in Example 8 (2) except that the amount of the toluene solution of a mixture of equimolar amounts of ethyl acrylate and aluminum trichloride being used was 26.7 mmol, the hydrogen partial pressure was 7 kg/cm$^2$G, and the ethylene partial pressure was 3 kg/cm$^2$G.

The properties of the above copolymer are shown in Table 3.

EXAMPLE 16

8.9 g of a copolymer was produced in the same manner as in Example 8 (2) except that the amount of the toluene solution of a mixture of equimolar amounts of ethylacrylate and aluminum trichloride being used was 26.7 mmol, the hydrogen partial pressure was 8 kg/cm$^2$G and the ethylene partial pressure was 2 kg/cm$^2$G.

The properties of the above copolymer are shown in Table 3.

EXAMPLE 17

12.6 g of a copolymer was produced in the same manner as in Example 8 (2) except that the amount of the toluene solution of a mixture of equimolar amounts of 2-ethylhexyl acrylate and aluminum trichloride being used was 50 mmol, the hydrogen partial pressure was 4 kg/cm$^2$G, and the ethylene partial pressure was 6 kg/cm$^2$G. A proton nuclear magnetic resonance ($^1$H-NMR) spectral analysis of the copolymer showed that the 2-ethylhexyl acrylate unit content of the copolymer was 7.4 mol%. The melt index of the copolymer as determined at 190° C. under a load of 21.6 kg was 96.7 g/10 min. The melting point of the copolymer as determined by DSc was 119° C. The degree of crystallization of the copolymer was 31%.

EXAMPLE 18

The copolymer produced in Example 8 was contacted with a 60 wt% aqueous sodium hydroxide solution at 80° C. for 3 hours in methanol and then fully washed with diluted hydrochloric acid. Upon further application of washing with water and drying, a hydrolysised product was obtained. In an infrared absorption spectrum of the above copolymer, an absorption peak at 1730 cm$^{-1}$ as assigned to the carbonyl group of carboxylic acid ester which had been observed before the above hydrolysis disappeared and instead an absorption peak at 1700 cm$^{-1}$ as assigned to the carbonyl group of carboxylic acid was observed. A $^{13}$C-NMR spectral analysis showed that the absorption peak at 14 ppm as assigned to the methyl group of ester carbon which had been observed before the hydrolysis disappeared. Based on the above data, it was understood that the saponified polymer was an ethyleneacrylic acid copolymer. The melting point of the ethylene-acrylic acid copolymer was 129° C.

The analytical results of the $^{13}$C-NMR spectra are shown in Table 4.

TABLE 3

| Run No. | Ethyl Acrylate Content (mol %) | Melt Index (g/10 min) | Melting Point (°C.) | Degree of Crystallization (%) |
|---|---|---|---|---|
| Example 8 | 2.5 | 0.15 | 128 | 50.4 |
| Example 9 | 0.63 | 0.02 | 131 | 59.5 |
| Example 10 | 1.0 | 0.02 | 131 | 56.5 |
| Example 11 | 3.6 | 0.075 | 127 | 46.6 |
| Example 12 | 5.8 | 0.002 | 126 | 45.1 |
| Example 13 | 7.6 | 0.50 | 124 | 40.9 |
| Example 14 | 9.3 | 0.85 | 123 | 39.5 |
| Example 15 | 13.0 | 1.52 | 122 | 36.5 |
| Example 16 | 15.0 | 2.58 | 121 | 33.9 |

TABLE 4

| Run No. | Principle Chain | | | | | homo $CH_2$ | Alkyl Branch (Long Chain) | | | Ethyl Branch (Principle Chain) Portion | |
|---|---|---|---|---|---|---|---|---|---|---|---|
| | Random $CH_2$ | | | | | | $CH_2$ | $CH_2$ | | | |
| | $\alpha\epsilon(\epsilon^+)$ | $\gamma\gamma$ | $\gamma\epsilon(\epsilon^+)$ | $\beta\delta(\delta^+)$ | $(CH_2)_n$ | $\alpha\alpha$ | $\alpha$ | $\beta$ | $CH_3$ | $CH_2$ | $CH_3$ |
| Example 8 | 33.7 | 30.0 | 28.9 | 26.9 | 29.5 | — | — | — | — | 26.4 | 10.7 |
| Example 17 | 33.7 | 30.0 | 28.9 | 26.9 | 29.5 | — | — | — | — | 26.4 | 10.2 |

The structure of the ethylene-ethyl acrylate random copolymer is as follows:

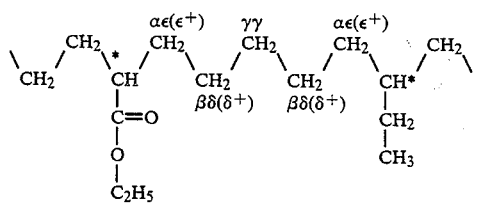

On the other hand, the structure of the ethyleneethyl acrylate block copolymer is, as described above, as follows:

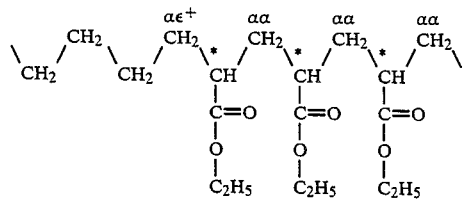

Based on the above results, it can be seen that the copolymer produced in Example 8 has $CH_2$ in a random arrangement like the copolymer produced by the high pressure method as in Comparative Example 2. As can be seen from the results of Table 3, the melting points of the copolymers produced in Examples 8 to 16 are lower than the melting point (135° C.) of the ethylene-ethyl acrylate block copolymer produced in Comparative Example 1. This is due to the fact that in the copolymers of Examples 8 to 16, the ethyl acrylate unit is bonded to the ethylene chain in a random arrangement, thereby disturbing the crystal of the polyethylene portion.

In a $^{13}C$—NMR spectral analysis of the copolymer of Example 17, an absorption peak as assigned to $\alpha\epsilon(\epsilon^+)$ is observed at 33.7 ppm, an absorption peak as assigned to $\gamma\gamma$, at 30.0 ppm, an absorption peak as assigned to $\gamma\epsilon(\epsilon^+)$, at 28.9 ppm, and an absorption peak as assigned to $\beta\delta(\delta^+)$, in the neighborhood of 26.9 ppm. This confirms that the copolymer of Example 17 is a random copolymer.

EXAMPLE 19 (1) Preparation of Chromium-Containing Catalyst Component

A chromium-containing catalyst component slurry was prepared in the same manner as in Example 4 (1).
(2) Production of Copolymer In a 500-ml reaction vessel the atmosphere of which had been replaced with argon, 300 ml of toluene, 0.87 ml (8 mmol) of ethyl acrylate and 8 mmol of ball milled aluminum chloride were placed. After purging several times with argon at 20° C., 1 mmol of diethylaluminum chloride as the organometallic compound component and 0.0025 mmol of the chromium catalyst component prepared in (1) above were added. Ethylene was introduced in the reaction vessel and polymerized for 3 hours while maintaining at 2 kg/cm$^2$G. At the end of the time, the ethylene was removed and a product was precipitated with methanol. The solid copolymer thus obtained was recovered by filtration and, after deashing treatment using a hydrochloric acid/methanol mixture, amorphous polymers were removed by extraction using acetone. The extraction residue was dried under reduced pressure at 80° C. for 2 hours to obtain 1.13 g of a white copolymer.

The catalyst activity was 8.7 kg/g. The copolymer thus obtained was subjected to an infrared absorption spectral analysis. This analysis showed an absorption peak at 1730 cm$^{-1}$ and an absorption peak at 1160 cm$^{-1}$ as assigned to an ether bond. Based on these data, it was determined that the ethyl acrylate content of the copolymer was 12.0 wt% and the conversion of ethyl acrylate to the copolymer was 17.0% (68.0%/0.01 mmol chromium). The melting point of the copolymer was 129° C. This is lower than the melting point (134° C.) of polyethylene produced using the same catalyst as above. A nuclear magnetic resonance spectral analysis showed that there was no peak assigned to an ethyl branch. Based on these data, it is believed that ethyl acrylate was introduced in the ethylene polymer chain in such a configuration as to disturb the crystal.

EXAMPLE 20

The procedure of (2) in Example 19 was repeated with the exception that the amount of the chromium catalyst component used was 0.005 mmol. The results are shown in Table 5.

EXAMPLE 21

The procedure of (2) in Example 19 was repeated with the exception that the amount of the chromium catalyst component used was 0.05 mmol. The results are shown in Table 5.

COMPARATIVE EXAMPLE 3

A vanadium-containing catalyst component was prepared in the same manner as in (1) of Example 19 except that 4.0 mmol of vanadium stearate was used in place of chromium stearate. Subsequently, ethylene and ethyl acrylate were copolymerized in the same manner as in (2) of Example 19 except that 0.02 mmol of the above vanadium-containing catalyst component was used in place of the chromium catalyst component.

The yield of the copolymer was 5.6 g, catalyst activity was 5.5 kg/g vanadium, and the ethyl acrylate content of the copolymer was 0.1 wt%. The conversion of ethyl acrylate was 0.7% and the melting point of the copolymer was 135° C.

COMPARATIVE EXAMPLE 4

A zirconium-containing catalyst component was prepared in the same manner as in (1) of Example 19 except that 4.0 mmol of zirconium stearate was used in place of chromium stearate. Subsequently, ethylene and ethyl acrylate were copolymerized in the same manner as in (2) of Example 19 except that 0.04 mmol of the above zirconium-containing catalyst component was used in place of the chromium catalyst component.

The yield of the copolymer was 0.08 g, and catalyst activity was 0.022 kg/g zirconium. The ethylacrylate content of the copolymer was 4.3 wt%, the conversion of ethyl acrylate was 4.3%, and the melting point of the copolymer was 134° C.

EXAMPLE 22 (1) Preparation of Chromium Catalyst Component

A chromium-containing catalyst component slurry was prepared in the same manner as in Example 1 (1).
(2) Production of Copolymer The procedure of (2) in Example 19 was repeated with the exception that 0.00235 mmol of the catalyst slurry prepared in (1) above was used as the chromium catalyst component. The results are shown in Table 5.

EXAMPLE 23

The procedure of (2) in Example 19 was repeated with the exception that 0.0047 mmol of the catalyst slurry prepared in (1) of Example 22 was used as the chromium catalyst component. The results are shown in Table 5.

EXAMPLE 24

The procedure of (2) in Example 19 was repeated with the exception that 0.047 mmol of the catalyst slurry prepared in (1) of Example 22 was used as the chromium catalyst component. The results are shown in Table 5.

EXAMPLE 25

The procedure of Example 22 was repeated with the exceptions that the amount of diethylaluminum chloride as the organometallic compound component used was 0.5 mmol and the ethylene partial pressure was maintained at 3 kg/cm²G. The results are shown in Table 5.

EXAMPLE 26

The procedure of Example 23 was repeated with the exception 1 mmol of triethylaluminum was used in place of the diethylaluminum chloride as the organometallic compound component. The results are shown in Table 5.

EXAMPLE 27

The procedure of Example 24 was repeated with the exception that 3.0 mmol of tetraethyltin was used in place of diethylaluminum chloride as the organometallic compound component. The results are shown in Table 5.

EXAMPLE 28

The procedure of Example 23 was repeated with the exception that 3.0 mmol of butylethylmagnesium was used in place of diethylaluminum chloride as the organometallic compound component. The results are shown in Table 5.

EXAMPLE 29

The procedure of Example 23 was repeated with the exception that 8 mmol of methyl methacrylate was used in place of ethyl acrylate as the unsaturated carboxylic acid ester. The results are shown in Table 5.

TABLE 5

| Run No. | Yield of Copolymer (g) | Catalytic Activity (kg/g Cr) | Unsaturated Carboxylic Acid Ester Content (wt %) | Conversion of Unsaturated Carboxylic Acid Ester (%)*1 | Melting Point of Copolymer (°C.) |
| --- | --- | --- | --- | --- | --- |
| Example 19 | 1.13 | 8.7 | 12.0 | 17.0 (68.0) | 129 |
| Example 20 | 1.19 | 4.6 | 7.8 | 11.6 (23.2) | 130 |
| Example 21 | 3.32 | 1.3 | 5.1 | 21.2 (4.2) | 131 |
| Example 22 | 1.19 | 9.7 | 11.4 | 17.0 (72.3) | 129 |
| Example 23 | 2.29 | 9.4 | 6.7 | 19.2 (40.8) | 130 |
| Example 24 | 2.95 | 1.2 | 5.8 | 21.4 (4.6) | 130 |
| Example 25 | 3.31 | 27.1 | 5.0 | 20.7 (88.1) | 130 |
| Example 26 | 3.14 | 12.8 | 2.9 | 11.4 (24.2) | 131 |
| Example 27 | 4.53 | 1.9 | 5.1 | 28.9 (6.1) | 130 |
| Example 28 | 1.15 | 4.7 | 6.4 | 9.2 (19.6) | 130 |
| Example 29 | 0.31 | 1.3 | 3.4 | 1.3 (2.8) | 130 |
| Comparative Example 3 | 5.6 | 5.5 | 0.1 | 0.7 (0.35) | 135 |
| Comparative | 0.08 | 0.022 | 4.3 | 0.4 (0.1) | 134 |

TABLE 5-continued

| Run No. | Yield of Copolymer (g) | Catalytic Activity (kg/g Cr) | Unsaturated Carboxylic Acid Ester Content (wt %) | Conversion of Unsaturated Carboxylic Acid Ester (%)[*1] | Melting Point of Copolymer (°C.) |
|---|---|---|---|---|---|
| Example 4 | | | | | |

[*1] Conversion (%) per 0.01 mmol of the chromium catalyst component

EXAMPLE 30 (1) Preparation of Catalyst Component

A 200-milliliter (ml) flask the atmosphere of which had been replaced with argon gas was charged with 2.1 grams (g) (6 millimoles (mmol)) of chromium triacetylacetonate, and then 200 ml of toluene was added and the chromium triacetylacetonate was dissolved therein. The solution thus prepared was used as the chromium catalyst component in the subsequent reaction. (2) Production of Ethylene Copolymer In a 500-ml pressure glass vessel the atmosphere of which had been replaced with argon gas, 300 ml of toluene and 0.87 ml (8 mmol) of ethyl acrylate were placed and 8 mmol of ball-milled aluminum trichloride was placed in a stream of argon, and then 0.5 mmol of diethylaluminum monochloride and 0.0025 mmol of the chromium catalyst component prepared in (1) above were added. Then, ethylene was introduced in the pressure glass vessel and polymerized at 20° C. for 3 hours while maintaining the pressure at 2 kg/cm$^2$G. At the end of the time, ethylene was purged and the reaction mixture was poured into methanol to precipitate the reaction product. The solid copolymer thus obtained was recovered by filtration and was subjected to de-ashing treatment using a hydrochloric acid/ methanol mixture, and then was extracted with acetone for 5 hours to remove amorphous polymers. The residue after extraction was dried under reduced pressure at 80° C. for 2 hours to obtain 1.32 g of a white copolymer. Catalytic activity (polymerization activity) was 10.1 kg/g chromium.

The copolymer thus obtained was subjected to an infrared absorption spectral analysis. This analysis showed an absorption peak at 1730 cm$^{-1}$ as assigned to a carbonyl group and an absorption peak at 1160 cm$^{-1}$ as assigned to an ether bond. Based on these peaks, it was confirmed that the ethyl acrylate content of the copolymer was 9.0% by weight (wt%) and the conversion of ethyl acrylate into the copolymer 59.6%/0.01 mmol chromium. The melting point of the copolymer was 130° C. This is lower than the melting point (135° C.) of polyethylene produced using the same catalyst as above. In a nuclear magnetic resonance spectral analysis, a peak as assigned to an ethyl branch was not observed. Based on these data, it is believed that ethyl acrylate was introduced in the ethylene polymer chain in such a configuration as to disturb the crystal. The above results are shown in Table 6.

EXAMPLE 31

The procedure of (2) in Example 30 was repeated with the exception that 0.5 mmol of triethylaluminum was used in place of diethylaluminum monochloride, thereby producing 1.10 g of a copolymer. This copolymer was measured for polymerization activity and so forth in the same manner as in Example 30. The results are shown in Table 6.

EXAMPLE 32

The procedure of (2) in Example 30 was repeated with the exception that 0.5 mmol of triisobutylaluminum was used in place of diethylaluminum monochloride, thereby producing 1.56 g of a copolymer. This copolymer was measured for polymerization activity and so forth in the same manner as in Example 30. The results are shown in Table 6.

EXAMPLE 33

The procedure of (2) in Example 30 was repeated with the exceptions that the amount of the chromium catalyst component used was 0.005 mmol, the amount of the diethylaluminum monochloride used was 1.0 mmol, the amount of the ethyl acrylate used was 20 mmol, and the amount of the aluminum trichloride used was 20 mmol, thereby producing 0.85 g of a copolymer. This copolymer was measured for polymerization activity and so forth in the same manner as in Example 30. The results are shown in Table 6.

EXAMPLE 34

The procedure of (2) in Example 30 was repeated with the exceptions that the amount of the chromium catalyst component used was 0.005 mmol and 8 mmol of methyl methacrylate was used in place of the ethyl acrylate, thereby producing 1.21 g of a copolymer. This copolymer was measured for polymerization activity and so forth in the same manner as in Example 30. The results are shown in Table 6.

EXAMPLE 35

The procedure of (2) in Example 30 was repeated with the exceptions that the amount of the chromium catalyst component used was 0.005 mmol and 1.0 mmol of tetraethyltin was used in place of the diethylaluminum monochloride, thereby producing 0.92 g of a copolymer. This copolymer was measured for polymerization activity and so forth in the same manner as in Example 30. The results are shown in Table 6.

EXAMPLE 36

The procedure of (2) in Example 30 was repeated with the exceptions that the amount of the chromium catalyst component used was 0.005 mmol and 1 mmol of butylethylmagnesium was used in place of the diethylaluminum monochloride, thereby producing 0.63 g of a copolymer. This copolymer was measured for polymerization activity and so forth in the same manner as in Example 30. The results are shown in Table 6.

EXAMPLE 37 (1) Preparation of Catalyst Component

A chromium-containing catalyst component slurry was prepared in the same manner as in Example 5 (1). (2) Production of Copolymer The procedure of (2) in Example 30 was repeated with the exceptions that 0.005 mmol of the solution prepared in (1) above was used as the chromium catalyst component and the amount of the diethylaluminum monochloride used was 1 mmol, thereby producing 3.44 g of a copolymer. This copolymer was measured for polymerization activity and so forth in the same manner as in Example 30. The results are shown in Table 6.

EXAMPLE 38 (1) Preparation of Catalyst Component

In a 200-ml flask the atmosphere of which had been replaced with argon, 0.95 g (6 mmol) of chromium trichloride was placed. Subsequently, 10 stainless steel balls (diameter: 5-8 mm) were placed and then 150 ml of toluene was added. The resulting mixture was ball milled with stirring at room temperature for 24 hours. The solution thus prepared was used as the chromium catalyst component in the subsequent reaction. (2) Production of Copolymer The procedure of (2) in Example 30 was repeated with the exceptions that 0.005 mmol of the solution prepared in (1) above was used as the chromium catalyst component and the amount of the diethylaluminum monochloride used was 1 mmol, thereby producing 0.64 g of a copolymer. This copolymer was measured for polymerization activity and so forth in the same manner as in Example 30. The results are shown in Table 6.

EXAMPLE 39 (1) Preparation of Catalyst Component

A chromium-containing catalyst component solution was prepared in the same manner as in Example 6 (1). (2) Production of Copolymer The procedure of (2) in Example 30 was repeated with the exceptions that 0.005 mmol of the solution prepared in (1) above was used as the chromium catalyst component and the amount of the diethylaluminum monochloride used was 1 mmol, thereby producing 1.9 g of a copolymer. This copolymer was measured for polymerization activity and so forth in the same manner as in Example 30. The results are shown in Table 6.

EXAMPLE 40 (1) Preparation of Catalyst Component

In a 200-ml flask the atmosphere of which had been replaced with argon, 1.51 g (7.33 mmol) of diphenylchromium was dissolved in 200 ml of toluene. The solution thus prepared was used as the chromium catalyst component in the subsequent reaction. (2) Production of Copolymer The procedure of (2) in Example 30 was repeated with the exceptions that 0.005 mmol of the solution prepared in (1) above was used as the chromium catalyst component and the amount of the diethylaluminum monochloride used was 1 mmol, thereby producing 1.48 g of a copolymer. This copolymer was measured for polymerization activity and so forth in the same manner as in Example 30. The results are shown in Table 6.

COMPARATIVE EXAMPLE 5

The procedure of (2) in Example 30 was repeated with the exception that 0.0025 mmol of vanadium bisacetylacetonate was used in place of the chromium catalyst component, thereby producing 0.46 g of a copolymer. This copolymer was measured for polymerization activity and so forth in the same manner as in Example 30. The results are shown in Table 6.

COMPARATIVE EXAMPLE 6

The procedure of (2) in Example 30 was repeated with the exception that 0.0025 mmol of vanadium trichloride was used in place of the chromium catalyst component, thereby producing 0.06 g of a copolymer.

This copolymer was measured for polymerization activity and so forth in the same manner as in Example 30. The results are shown in Table 6.

TABLE 6

| Run No. | Polymerization Activity (kg/g chromium) | Unsaturated Carboxylic Acid Content (wt %) | Conversion of Unsaturated Carboxylic Acid Ester (%/0.01 mmol chromium) | Melting Point of Copolymer (°C.) |
|---|---|---|---|---|
| Example 30 | 10.1 | 9.0 | 59.6 | 130 |
| Example 31 | 8.5 | 10.3 | 56.7 | 130 |
| Example 32 | 12.0 | 6.2 | 48.4 | 131 |
| Example 33 | 3.3 | 14.4 | 12.2 | 129 |
| Example 34 | 9.3 | 6.8 | 41.1 | 131 |
| Example 35 | 3.5 | 7.3 | 16.8 | 130 |
| Example 36 | 2.4 | 8.4 | 13.1 | 130 |
| Example 37 | 13.2 | 9.0 | 77.4 | 130 |
| Example 38 | 4.9 | 5.6 | 17.9 | 131 |
| Example 39 | 7.3 | 4.5 | 21.4 | 131 |
| Example 40 | 5.7 | 6.2 | 22.9 | 130 |
| Comparative Example 5 | 3.6 | 0.3 | 0.7 | 135 |
| Comparative Example 6 | 0.47 | 0.1 | 0.3 | 135 |

What is claimed is:

1. An ethylene copolymer consisting essentially of a repeating unit (A) represented by the formula:

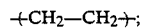

a repeating unit (B) represented by the formula:

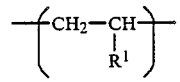

(wherein $R^1$ represents an alkyl group having 1 to 20 carbon atoms); and a repeating unit (C) represented by the formula:

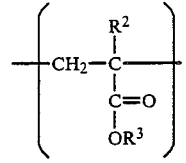

(wherein $R^2$ represents a hydrogen atom, a halogen atom, an alkyl group having 1 to 20 carbon atoms, an alkenyl group having 3 to 20 carbon atoms, a cycloalky group having 3 to 20 carbon atoms, an aryl group having 6 to 20 carbon atoms or an aralkyl group having 7 to 20 carbon atoms, and $R^3$ represents a hydrogen atom, an alkyl group having 1 to 20 carbon atoms, an alkenyl group having 3 to 20 carbon atoms, a cycloalkyl group having 3 to 20 carbon atoms, an aryl group having 6 to 20 carbon atoms or an aralkyl group having 7 to 20 carbon atoms), said repeating units (A), (B) and (C) being orientated in a random and straight chain arrangement, said repeating unit (B) content being 0 to 45 mol%, said repeating unit (C) content being 0.001 to 45 mol%, and said copolymer having a weight average molecular weight of at least 5,000.

2. The ethylene copolymer as claimed in claim 1, consisting of the repeating units (A) and (C) only.

3. The ethylene copolymer of claim 1 wherein said repeating unit (C) content is at least 0.1%.

4. The ethylene copolymer of claim 1 wherein said repeating unit (C) content is at least 1%.

5. The ethylene copolymer of claim 1 wherein said repeating unit (B) content is 0 to 30 mole % and said repeating unit (C) content is 0.1 to 30 mole %.

6. The ethylene copolymer of claim 1 wherein said repeating unit (C) content is 0.1 to 30 mole %.

7. The ethylene copolymer of claim 1 wherein said repeating unit (C) content is 1 to 15 mole %.

8. The ethylene copolymer of claim 7 wherein said repeating unit (B) content is 0 to 15 mole %.

9. The ethylene copolymer of claim 8 wherein said weight average molecular weight is 10,000 to 3,000,000.

10. The ethylene copolymer of claim 1 wherein said weight average molecular weight is 10,000 to 3,000,000.

11. The ethylene copolymer of claim 2 wherein said repeating unit (C) content is at least 0.1%.

12. The ethylene copolymer of claim 2 wherein said repeating unit (C) content is at least 1%.

13. The ethylene copolymer of claim 2 wherein said repeating unit (C) content is 0.1 to 30 mole %.

14. The ethylene copolymer of claim 2 wherein said repeating unit (C) content is at 1 to 15 mole %.

15. The ethylene copolymer of claim 2 wherein said weight average molecular weight is 10,000 to 3,000,000.

* * * * *